(12) United States Patent
Flores Miranda et al.

(10) Patent No.: US 9,820,336 B2
(45) Date of Patent: Nov. 14, 2017

(54) DUAL CHANNEL WI-FI FOR CONGESTED WLANS WITH ASYMMETRIC TRAFFIC LOADS

(71) Applicant: William Marsh Rice University, Houston, TX (US)

(72) Inventors: Adriana B. Flores Miranda, Houston, TX (US); Edward W. Knightly, Houston, TX (US)

(73) Assignee: William Marsh Rice University, Houston, TX (US)

( * ) Notice: Subject to any disclaimer, the term of this patent is extended or adjusted under 35 U.S.C. 154(b) by 223 days.

(21) Appl. No.: 14/509,723

(22) Filed: Oct. 8, 2014

(65) Prior Publication Data

US 2015/0100619 A1   Apr. 9, 2015

Related U.S. Application Data

(60) Provisional application No. 61/888,285, filed on Oct. 8, 2013.

(51) Int. Cl.
*H04W 88/08* (2009.01)
*H04W 74/08* (2009.01)

(52) U.S. Cl.
CPC ....... *H04W 88/08* (2013.01); *H04W 74/0866* (2013.01)

(58) Field of Classification Search
None
See application file for complete search history.

(56) References Cited

U.S. PATENT DOCUMENTS

2010/0281338 A1* 11/2010 Liu ..................... H04L 1/0022
                                                                    375/340
2011/0019725 A1*  1/2011 Keller .................. H04L 5/0042
                                                                    375/222

* cited by examiner

*Primary Examiner* — Jeffrey R Swearingen
(74) *Attorney, Agent, or Firm* — Osha Liang LLP (57) ABSTRACT

A method of wireless local area network communication between a client and an access point includes sending, by the client, a client-originated message to the access point over a bidirectional upload channel; receiving, by the client, a client-acknowledgement message from the access point over the bidirectional upload channel; receiving, by the client, an access point-originated message from the access point over a bidirectional download channel that was generated in response to the client-originated message; and sending, by the client, an access point-acknowledgement message to the access point over the bidirectional download channel. The bidirectional download channel is separate from the bidirectional upload channel.

2 Claims, 10 Drawing Sheets

DUAL CHANNEL WI-FI FOR CONGESTED WLANS WITH ASYMMETRIC TRAFFIC LOADS

CROSS-REFERENCE TO RELATED APPLICATIONS

This application claims priority under 35 U.S.C. §119(e) to U.S. Provisional Patent Application Ser. No. 61/888,285 filed on Oct. 8, 2013. U.S. Provisional Patent Application Ser. No. 61/888,285 is hereby incorporated by reference in to the instant application.

STATEMENT REGARDING FEDERALLY SPONSORED RESEARCH OR DEVELOPMENT

The invention was made with government support under Grant Number CNS-1126478 awarded by the National Science Foundation. The invention was made with government support under Grant Number CNS-1012831 awarded by the National Science Foundation. The government has certain rights in the invention.

BACKGROUND

Wireless local area networks (WLANs) are methods of communicating between nodes in a network within a limited area via a wireless link. Network nodes may include clients such as mobile telephone devices or laptop computers and access points such as routers or gateways. In some cases, access points provide access to an additional network such as the internet or a private network to the clients.

The wireless link allows clients to communicate with the additional network, via the access point, without being physically connected to the access point via a communication cable. However, a wireless link is an inherently limited communication medium. All nodes communicating via the wireless link may interfere with one another.

SUMMARY

In one aspect, a method of wireless local area network communication between a client and an access point may include sending, by the client, a client-originated message to the access point over a bidirectional upload channel; receiving, by the client, an client-acknowledgement message from the access point over the bidirectional upload channel; receiving, by the client, an access point-originated message from the access point over a bidirectional download channel that was generated in response to the client-originated message; and sending, by the client, an access point-acknowledgement message to the access point over the bidirectional download channel.

In one aspect, a method of wireless local area network communication between a client and an access point may include receiving, by the access point, a client-originated message over a bidirectional upload channel; sending, by the access point, an access point-acknowledgement message to the client over the bidirectional upload channel; sending, by the access point, an access point-originated message to the client over a bidirectional download channel that was generated in response to the client-originated message; and receiving, by the access point, a client-acknowledgement message from the client over the bidirectional download channel.

In one aspect, an access point may include a download chain that may include a download media access control layer and a download physical layer, a download transceiver, and a download antenna, wherein the download chain. The download chain may send an access point-originated message over a bidirectional download channel and receive a client-acknowledgement message on the bidirectional download channel. The access point may include an upload chain that may include an upload media access control layer and an upload physical layer, an upload transceiver, and an upload antenna. The upload chain may receive a client-originated over a bidirectional upload channel and send an access point-acknowledgement message on the bidirectional upload channel. The access point may include a controller that forwards the download data to the download chain and forwards the upload acknowledgement to the upload chain.

Other aspects of the disclosure will be apparent from the following description and the appended claims.

BRIEF DESCRIPTION OF DRAWINGS

Certain embodiments of the disclosure will hereafter be described with reference to the accompanying drawings. It should be understood, however, that the accompanying drawings illustrate the various implementations described herein and are not meant to limit the scope of various technologies described herein. The drawings show and describe various embodiments of the current disclosure.

DETAILED DESCRIPTION

Specific embodiments will now be described with reference to the accompanying figures. In the following description, numerous details are set forth as examples. It will be understood by those skilled in the art that one or more embodiments of the present invention may be practiced without these specific details and that numerous variations or modifications may be possible without departing from the scope. Certain details known to those of ordinary skill in the art are omitted to avoid obscuring the description.

In general, embodiments of the invention relate to a wireless channel architecture that includes a mechanism to allocate spectrum resources for wireless transmissions. One or more embodiments of the invention allocate spectrum resources based on the direction of the data transmissions, which allows the configuration of spectrum resources to match performance to the system's traffic asymmetry.

Figure 1:
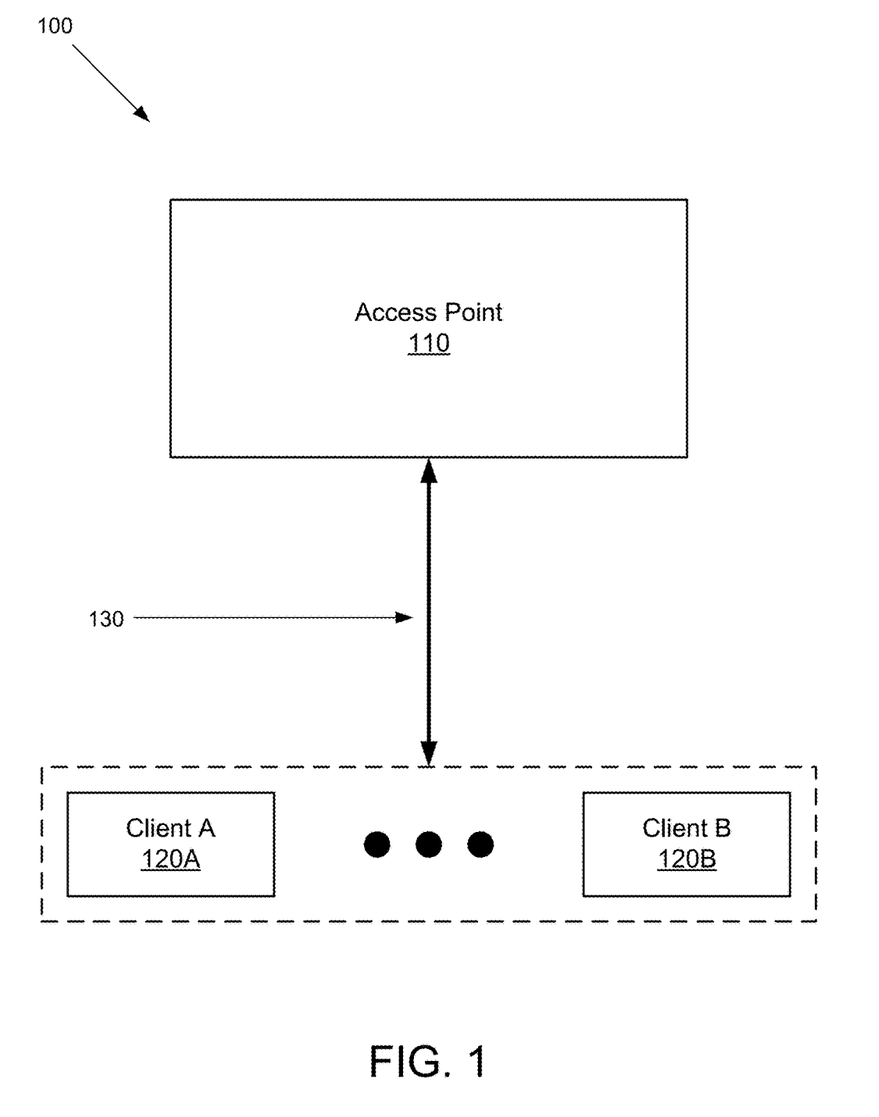
FIG. 1 shows a wireless network in accordance with one or more embodiments of the invention.

FIG. 1A shows a wireless channel architecture (100) in accordance with one or more embodiments of the invention. The wireless channel architecture (100) includes an access point (AP) (110) and a number of clients (120A, 120B) connected by a wireless link (130). The AP (110) may be connected to an additional network (not shown) via a wired or wireless link. In one or more embodiments of the invention, the additional network is the Internet or a private network.

Figure 3:
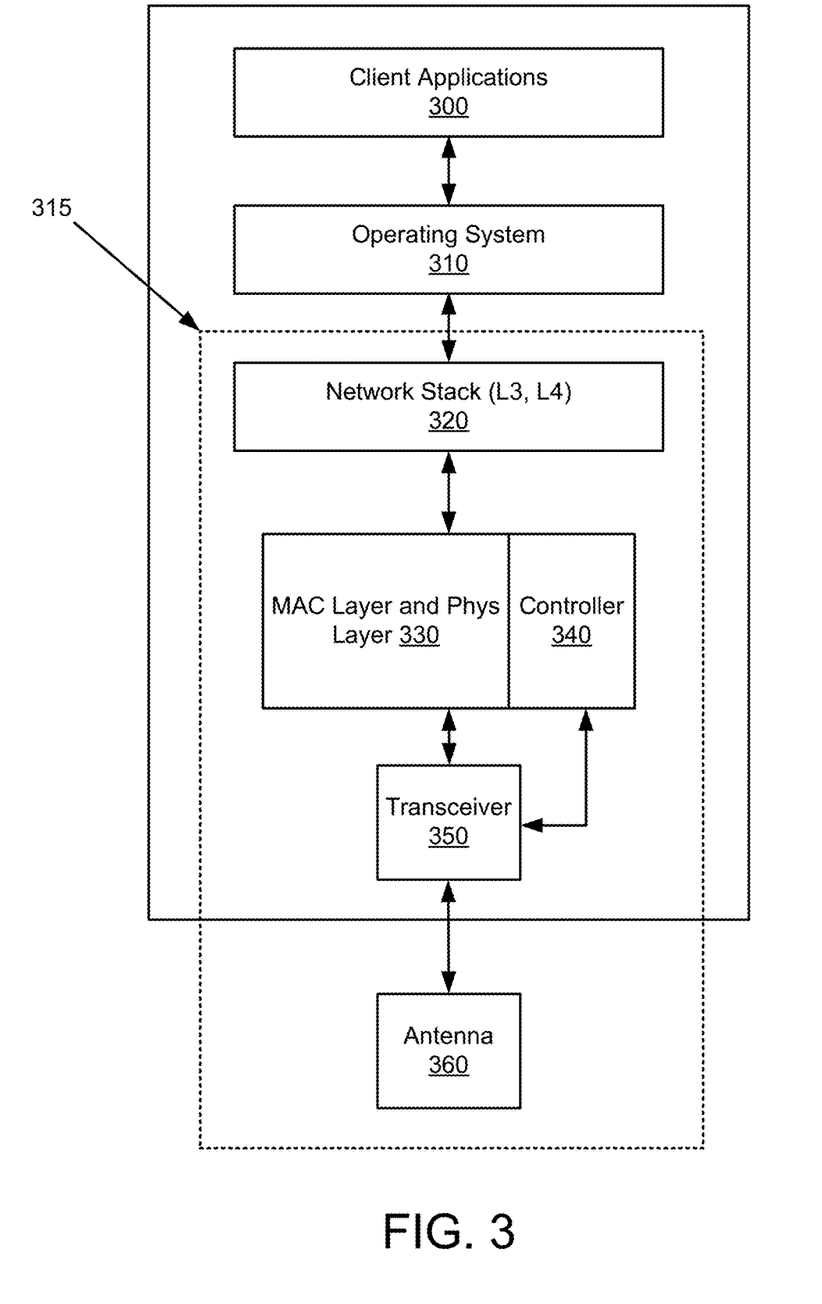
FIG. 3 shows a client in accordance with one or more embodiments of the invention.
Figure 5A:
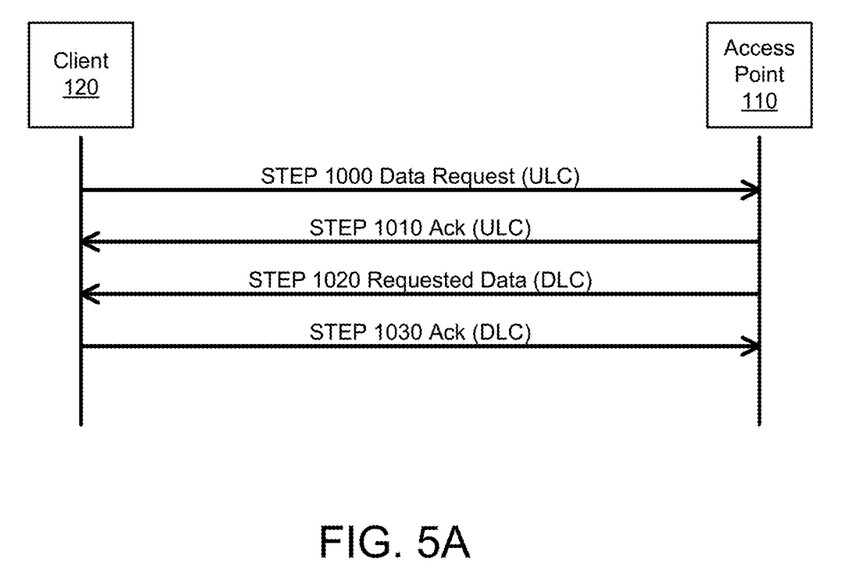
FIGS. 5A-5C show flow diagrams in accordance with one or more embodiments of the invention.
Figure 5B:
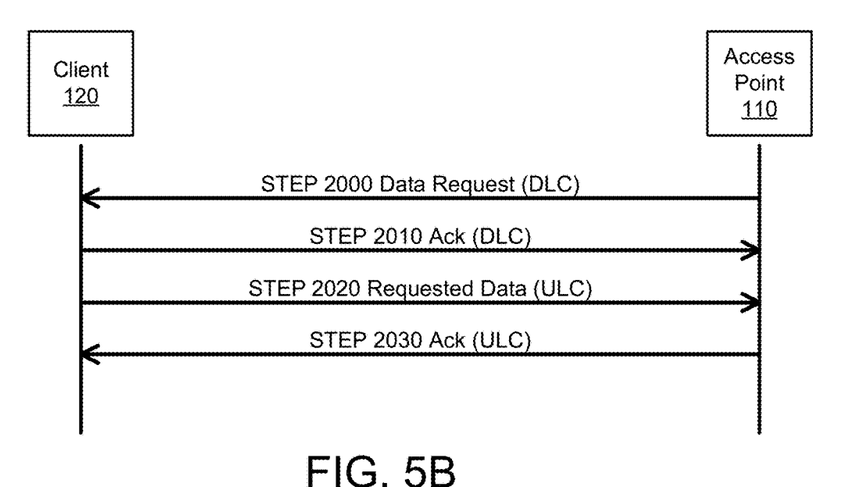

In one embodiment of the invention, the client (120A, 120B) may correspond to any communication device that includes functionality to implement embodiments of the invention (see e.g., FIGS. 3, 5A-5B). Examples of communication devices may include, but are not limited to, a phone, smart phone, a laptop, a wireless access point, a wireless router, a gaming console, a set top box, a television, a tablet computer, and a desktop computer.

When the AP (110) is connected to the additional network, the clients (120) communicate with the additional network through the AP (110) via the wireless link (130). The wireless link (130) is discussed below. In one or more embodiments of the invention, the AP (110) acts as a link controller that regulates communications through the wireless link (130). For example, the AP (110) may send update messages to the clients (120) that instruct the clients (120) to use a specific protocol, method of data encoding, channel assignment, message format, etc.

The wireless link (130) includes two logical channels: a bidirectional upload channel and a bidirectional download channel. Messages between the AP (110) and clients (120) are sent via the bidirectional upload channel or bidirectional download channel, based on the message type and message sender. Messages are classified as either originated messages or acknowledgement messages. Originated messages are new messages and acknowledgement messages are acknowledgements of received originated messages. Each originated message sent over the wireless link (130) is acknowledged. Originated messages from the AP (110) are sent over the bidirectional download channel and originated messages from the clients (120A, 120B) are sent over the bidirectional upload channel. When a message is received by the AP (110) on the bidirectional upload channel, the AP (110) sends an acknowledgement message over the bidirectional upload channel acknowledging receipt of the received message. When a message is received by one of the clients (120) on the bidirectional download channel, the client sends an acknowledgement message over the bidirectional download channel acknowledging receipt of the received message.

The bidirectional upload channel and bidirectional download channel are asynchronous. Messages, either originated or acknowledgement, may be sent over each channel at any time. Each channel may only be utilized by an individual entity (e.g., a client or the access point) at a time. In one embodiment of the invention, each client (120) or the access point (110) that wishes to send an originated message (not an acknowledgement message) over the channel contends for the channel as defined by the IEEE 802.11 communication protocol. In one or more embodiments of the invention, contention for each channel is reduced by separating the types of messages sent over each channel. For example, in one or more embodiments of the invention, in a system of one access point and a number of clients, the contention for the download channel is eliminated because only the access point may send originated messages on the download channel.

Figure 2:
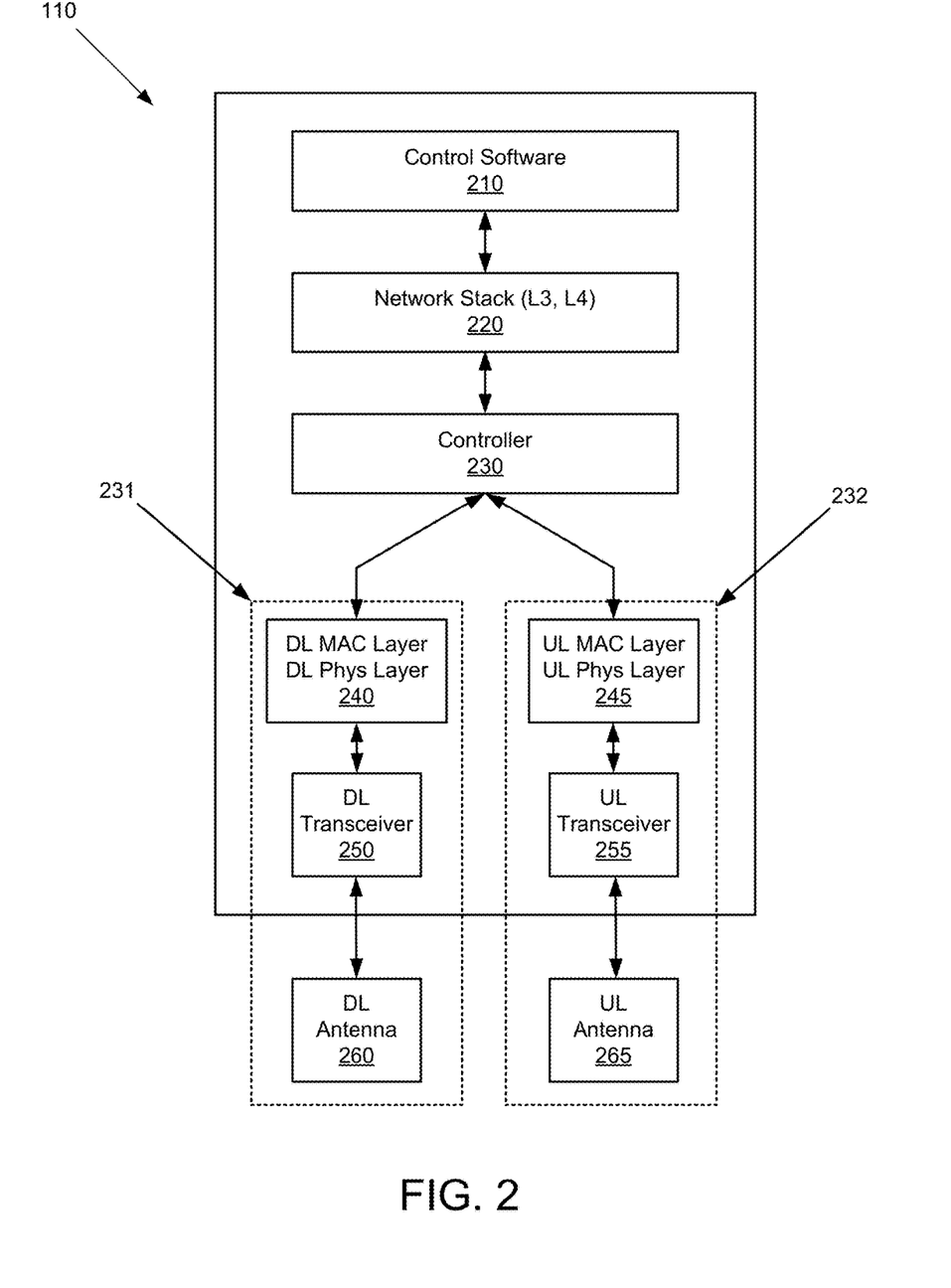
FIG. 2 shows an access point in accordance with one or more embodiments of the invention

FIG. 2 shows a diagram of an AP (110) in accordance with one or more embodiments of the invention. The AP (110) includes the necessary hardware, software and/or firmware to support two bidirectional communication channels. The AP (110) may include control software (210), such as an operating system, which governs the overall operation of the AP (110).

The AP (110) may also include a network stack (220) that manages network connections and communication flow in order to support the Internet Protocol (IP) (or other layer 3 protocols) and the transmission control protocol (TCP) (or other layer 4 protocols).

Further, the AP (110) includes a download chain (231) and an upload chain (232). In one embodiment of the invention, the download chain (231) includes hardware, firmware, and/or software, components to support the bidirectional download channel, and the upload chain (232) includes similar components to support the bidirectional upload channel. The download chain (231) includes a download media access control (MAC) layer and a download physical layer (240), a download transceiver (250), and a download antenna (260). The upload chain (232) includes an upload MAC layer and a download physical layer (245), an upload transceiver (255), and an upload antenna (265). The hardware and software components allow data to be sent over the channels. The DL MAC layer and DL Phys Layer (240) provide layer 2 and layer 1 functionality for the bidirectional download channel. Further, the UL MAC layer and UL Phys Layer (245) provide layer 2 and layer 1 functionality for the bidirectional upload channel.

The AP (110) further includes a controller (230) that controls communications over the wireless link (130). The controller (230) manages communications over the bidirectional upload channel and bidirectional download channel. More specifically, the controller (230) determines whether a given message or acknowledgement is to be sent via the bidirectional download channel or the bidirectional upload channel (see FIGS. 5A-5, below).

The controller (230) may also manage the operation of the download transceiver (250) and upload transceiver (255). For example, the controller may set the band of operation of each transceiver according to the download bandwidth (441) and the upload bandwidth (442).

In one embodiment of the invention, the controller may be implemented in hardware, software, or a combination of hardware and software. Further, the controller may be conceptually part of the layer 2 processing that is performed by the AP. In on embodiment of the invention, the network stack (220) is not aware of the modified layer 2 processing that is occurring in the AP. Said another way, embodiments of the invention are implemented such that the network stack (220) is not aware that messages and acknowledgements are processed as shown in FIGS. 5A and 5B.

Those skilled in the art will appreciate that while FIG. 3 shows a client that includes only a single transceiver and a single antenna, embodiments of the invention may be implemented with client that include a two-antenna design that is equivalent to the two-antenna design that is shown in FIG. 2 or the AP.

FIG. 3 shows a diagram of a client (120A, 120B) in accordance with one or more embodiments of the invention. The client (120A, 120B) includes the necessary hardware, software and/or firmware to support two bidirectional communication channels. The client (120) may also include one or more client applications (300), such as an Internet browser, and an operating system (310) that governs the overall operation of the client (120).

The client (120A, 120B) also includes a network stack (320) that manages network connections and communication flow in order to support the Internet Protocol (IP) (or other layer 3 protocols) and the transmission control protocol (TCP) (or other layer 4 protocols).

The client includes a messaging chain (315). The messaging chain (315) includes hardware, software, and/or firmware components to support the bidirectional download channel and the bidirectional upload channel. The messaging chain (315) includes a MAC layer and a physical layer (330), a transceiver (350), and an antenna (360). The MAC layer and Phys Layer (330) provide layer 2 and layer 1 functionality for the bidirectional channel, which may operate, at any given time, as either an upload channel or a download channel.

The messaging chain (315) may also include a controller (340) that adjusts the operational band of the transceiver (350). The controller (340) sets the operational band depending on the type of message being sent. If the message is an originated message, the message is sent over the bidirectional upload channel and the operational band is set to the upload bandwidth (442). If the message is an acknowledgement message, the message is sent over the bidirectional download channel and the operational band is set to the download bandwidth (441). Further, the controller may be conceptually part of the layer 2 processing that is performed by the client.

As discussed above, embodiments of the invention allocate different channels for upload traffic (i.e., data (excluding acknowledgements) sent from a client to an AP) and download traffic (i.e., data (excluding acknowledgements) sent from an AP to a client). The following section describes how different channels may be allocated within the wireless link.

Figure 4A:
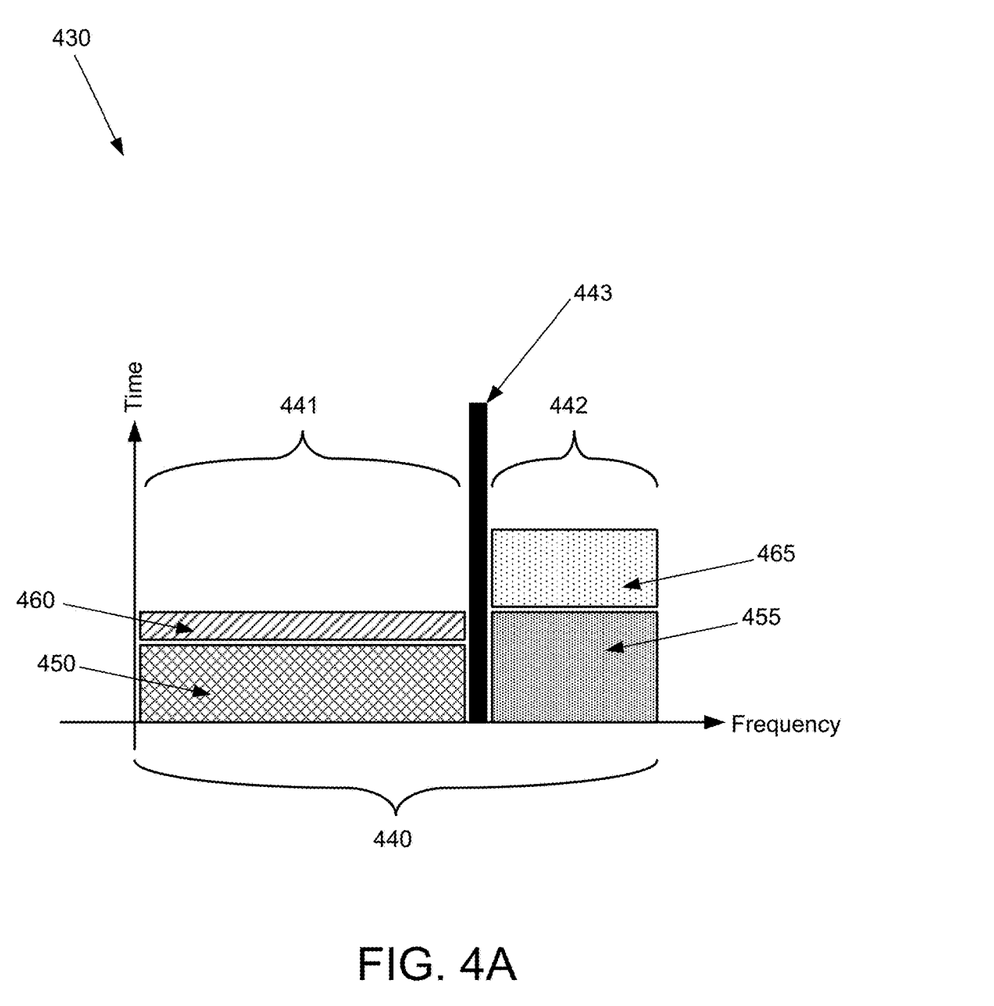
FIG. 4A shows a spectrum allocation diagram in accordance with one or more embodiments of the invention.

FIG. 4A shows a physical channel allocation diagram of the wireless link (130) in accordance with one or more embodiments. The physical channel allocation diagram shows the spectral implementation of the two logical channels. The wireless link (130) includes a total communication bandwidth (440) that is the total bandwidth utilized by the wireless link (130). In one or more embodiments, the total communication bandwidth (440) may be a single channel defined by the IEEE 802.11 communication protocol. In such cases, bandwidth may be allocated to each individual channel (441, 442) by associating a specific frequency range (i.e., a sub-channel) within a single channel to each of the download channel and the upload channel, where the frequency ranges are non-contiguous. In one or more embodiments of the invention, a guard band (443) provides isolation between the bidirectional download channel and bidirectional upload channel.

Figure 4B:
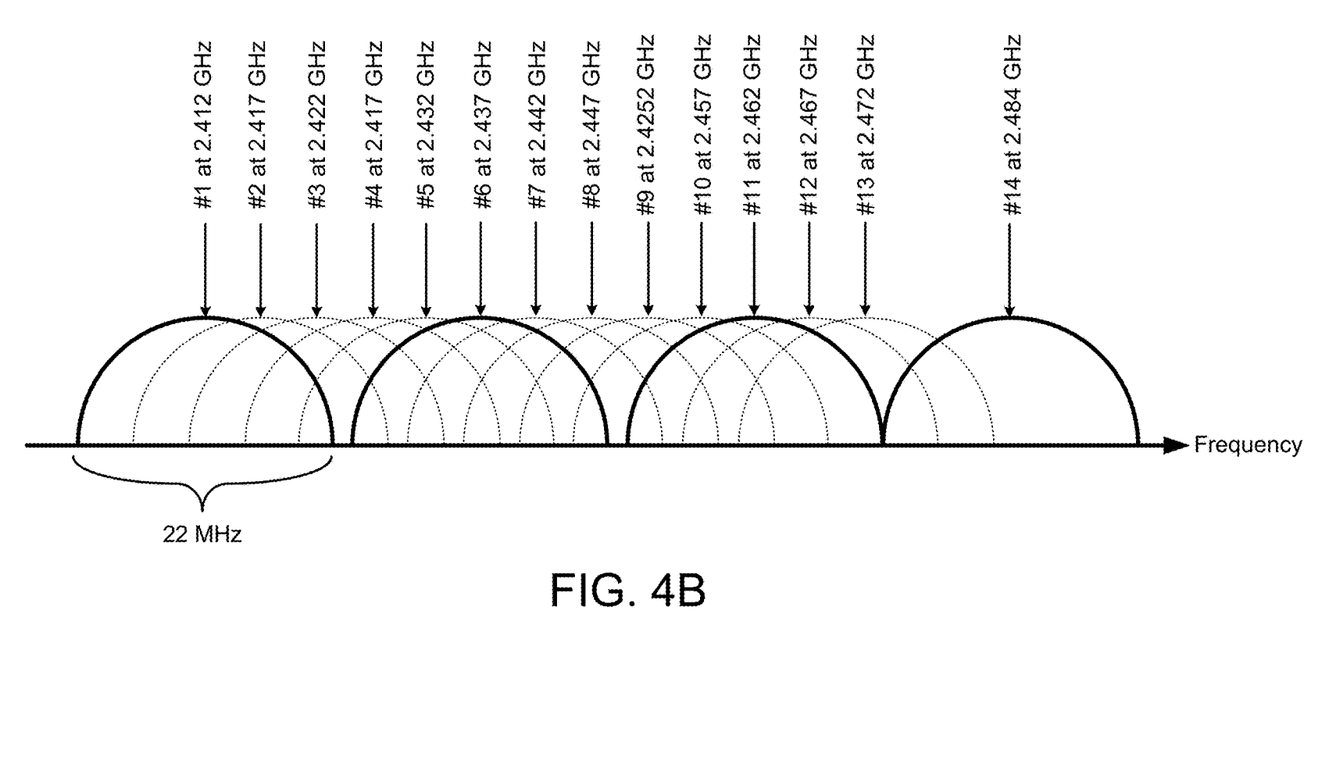
FIG. 4B shows a diagram of the channels defined by the IEEE 802.11 communication protocol for the 2.4 GHz band.

Alternatively, referring to FIG. 4B, the download channel bandwidth and the upload channel bandwidth may be determined by allocating one or more discrete channels to each of the bidirectional upload channel or the bidirectional download channel. For example, FIG. 4B shows a diagram of the channels defined by the IEEE 802.11 communication protocol. Each channel includes a 22 MHz bandwidth that potentially overlaps neighboring channels. There are a total of 14 channels and the center frequency of each of the first 13 channels is separated by 5 MHz from neighboring channels. In one or more embodiments, the total communication bandwidth (140) may be multiple channels defined by the IEEE 802.11 communication protocol. In one or more embodiments of the invention, the total bandwidth may be a continuous bandwidth, such as channels 1-4 as defined by the IEEE 802.11 communication protocol, or a number of discontinuous bands, such as channels 1, 8 and 13 as defined by the IEEE 802.11 communication protocol. Further, each of the upload channel and the download channel may be associated with one or more of the aforementioned channel (e.g., the upload channel is associated with channel #1 at 2.412 GHz and channel #6 at 2.437 GHz, while the download channel is associated with channel #11 sat 2.462 GHz and channel #14 at 2.484 GHz). In one or more embodiments of the invention, the total communication bandwidth (140) may be multiple discrete channels at a number of frequencies such as the whitespaces between existing television broadcasting frequencies or any other communication bands known to one of ordinary skill in the art, e.g., 5 GHz, 60 GHz, etc.

Returning to FIG. 4A, AP-originated messages (450) are sent over the bidirectional download channel utilizing the download channel bandwidth (441). AP-acknowledgement messages (460) sent by clients (120A, 120B) in response to AP-originated messages (450) are sent over the bidirectional download utilizing the download channel bandwidth (441). Client-originated messages (455) are sent over the bidirectional upload utilizing the upload channel bandwidth (442). Client-acknowledgement messages (465) sent by the access point (110) in response to client-originated messages (455) are sent over the bidirectional upload utilizing the upload channel bandwidth (442).

In one embodiment of the invention, the upload channel bandwidth (442) and download channel bandwidth (441) are set by the AP (110). The AP (110) may continuous monitors the wireless link load ratio which is the download load, e.g. the average quantity of data being sent from the AP (110) to the clients (120A, 120B), to the upload load, e.g. the quantity of data being sent from the clients (120A, 120B) to the AP (110). Further, the AP (110) may continuously compare the wireless link load ratio to the ratio of the download channel bandwidth (442) to the upload channel bandwidth (441). If the values of these ratios are different, the AP (110) may update the download channel bandwidth (442) and the upload channel bandwidth (441) to match (or more closely approximate) the wireless link load ratio.

FIG. 5A shows a method according to one or more embodiments of the invention. The method depicted in FIG. 5A may be used to transfer data from an additional network to a client (120) over a wireless link in accordance with one or more embodiments of the invention. One or more steps shown in FIG. 5A may be omitted, repeated, and/or performed in a different order among different embodiments of the invention. Each step of FIG. 5A is designated as (ULC) if the signal is send over the bidirectional upload channel or (DLC) if sent over the bidirectional download channel.

At STEP 1000, a client sends a client-originated message to an access point. The client-originated message may, for example, request data contained on the additional network. For example, the client may request a web page, audio file, or video file located on a remote server connected to the Internet. The client-originated message is sent via the bidirectional upload channel utilizing the upload bandwidth. In one embodiment of the invention, sending a client-originated message includes: (i) receiving the client-originated message (in the form of one or more IP packets) by the MAC layer (330), (ii) determining (e.g., by the controller (340)) that the received message is a client-originated message, (iii) setting, by the controller (340), the operational band on the transceiver (350) to the upload channel, (iv) encapsulating the received IP packets by the MAC layer (330) to generate one or more MAC frames, (v) sending the MAC frames to the Physical layer (330), where the physical layer (330)

subsequently provides the MAC frames(s) to the transceiver in order for the transceiver (350) to transmit the MAC frames to the AP via the wireless link (130).

At STEP 1010, the AP sends, in response to receiving the client-originated message, a client-acknowledgement message. The client-acknowledgement message includes an acknowledgement that the client-originated message was received. The client-acknowledgement message is sent via the bidirectional upload channel utilizing the upload bandwidth. The AP subsequently communicates with the additional network to acquire the requested data. In one embodiment of the invention, the AP receives the client-originated message, e.g., in the form of one or more MAC frames, on the transceiver (255) that is part of the upload chain (232). Further, the AP sends the client-acknowledgement to the client via the upload chain (232) and the wireless link (130). In one embodiment of the invention, the client-acknowledgment is generated by the UL MAC layer (245). Further, after the client receives the client-acknowledgment, the controller (340) may switch the operational band of the transceiver to the download channel.

At STEP 1020, the AP sends an AP-originated message to the client. The AP-originated message includes the requested data or information related to the requested data. The AP-originated message is sent via the bidirectional download channel utilizing the download bandwidth. In one embodiment of the invention, sending a client-originated message includes: (i) receiving the client-originated message (in the form of one or more IP packets) by the controller (230), (ii) determining (e.g., by the controller (230)) that the received message is an AP-originated message, (iii) forwarding the IP packets, by the controller (230), to the download chain (231), (iv) encapsulating the received IP packets by the MAC layer (240) to generate one or more MAC frames, (v) sending the MAC frames to the Physical layer (240), where the physical layer (240) subsequently provides the MAC frames(s) to the transceiver in order for the transceiver (250) to transmit the MAC frames to the client via the wireless link.

At STEP 1030, the client sends, in response to receiving the AP-originated message, an AP-acknowledgement message. The AP-acknowledgement message includes an acknowledgement that the AP-originated message was received. The AP-acknowledgement message is sent via the bidirectional download channel utilizing the download bandwidth. In one embodiment of the invention, the client receives the AP-originated message, e.g., in the form of one or more MAC frames, on the transceiver (350). Further, the client sends the AP-acknowledgement to the AP via the download channel and the wireless link (130). In one embodiment of the invention, the AP-acknowledgment is generated by the MAC layer (330).

FIG. 5B shows a signaling diagram of a method according to one or more embodiments of the invention. The method depicted in FIG. 5B may be used to transfer data from a client (120) to an additional network over a wireless link in accordance with one or more embodiments of the invention. One or more steps shown in FIG. 5B may be omitted, repeated, and/or performed in a different order among different embodiments of the invention. Each step of FIG. 5B is designated as (ULC) if the signal is send over the bidirectional upload channel or (DLC) if sent over the bidirectional download channel.

At STEP 2000, the AP sends an AP-originated message to a client. The AP-originated message includes a request for data on the client. For example, an additional network may request a photo that is located on the client. The AP-originated message is sent to the client using the download chain (231) utilizing the download bandwidth.

At STEP 2010, the client sends, in response to the AP-originated message, an AP-acknowledgement message. The AP-acknowledgement message includes an acknowledgement that the AP-originated message was received. The AP-acknowledgement message is sent via the bidirectional download channel utilizing the download bandwidth.

At STEP 2020, the client sends a client-originated message. The client-originated message includes the requested data or information about the requested data. The client-originated message is sent via the bidirectional upload channel utilizing the upload bandwidth.

At STEP 2030, the AP sends, in response to the client-originated message, a client-acknowledgement message. The client-acknowledgement message includes an acknowledgement that the client-originated message was received. The client-acknowledgement message is sent using the upload chain utilizing the upload bandwidth. The AP then sends the requested data to the additional network.

Figure 5C:
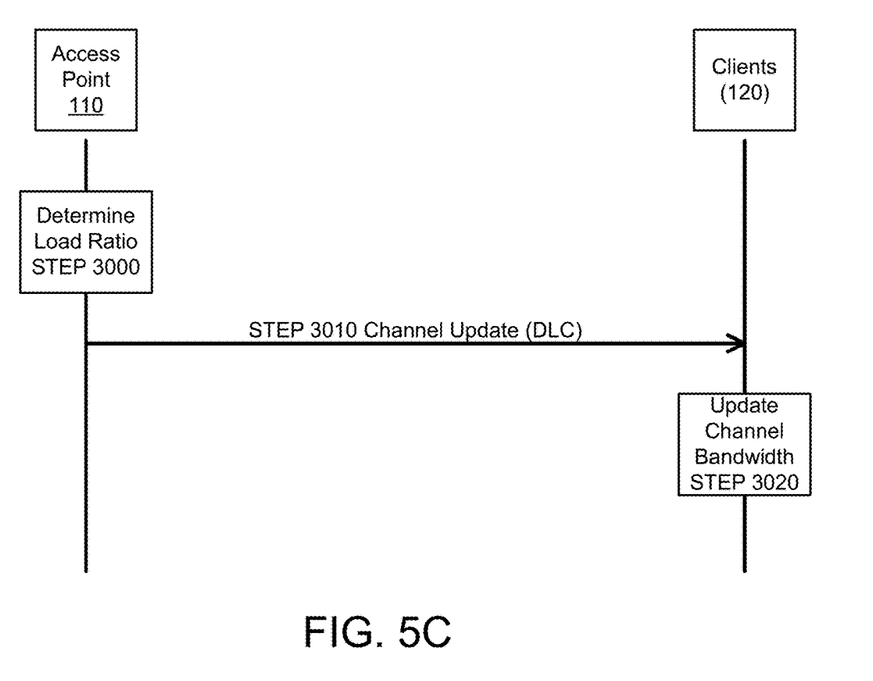

In some cases, a traffic load ratio may change and the AP may need to reallocate the total communication bandwidth (130). FIG. 5C illustrates a method of reallocating bandwidth (130) to the download bandwidth and the upload bandwidth in accordance with one or more embodiments of the invention. One or more steps shown in FIG. 5C may be omitted, repeated, and/or performed in a different order among different embodiments of the invention. Each step of FIG. 5C is designated as (ULC) if the signal is send over the bidirectional upload channel or (DLC) if sent over the bidirectional download channel.

At STEP 3000, the access point determines that the wireless link load ratio has changed. For example, a number of clients may begin to request many video files contained on the additional network. Such requests may increase the amount of data that needs to be sent from the AP to the clients over the wireless link. In one or more embodiments of the invention, the access point determines a new download bandwidth and a new upload bandwidth in response to determining that the wireless link load ratio has changed. In one or more embodiments of the invention, the access point determines a ratio of a new download bandwidth to a new upload bandwidth in response to determining that the wireless link load ratio has changed.

At STEP 3010, the AP sends a channel update message to all of the clients. In one or more embodiments of the invention, the channel update message including a new download bandwidth and a new upload bandwidth. More specifically, the channel update message includes the new channels that will be used for the download and upload channels. Said another way, the channel update message will specify one or more channel(s) (see FIG. 4B) or frequency ranges that are to be used for each of the upload channel and the download channel. The channel update message is sent via the bidirectional download channel utilizing the download bandwidth. In one or more embodiments of the invention, the channel update message is sent through a broadcast system according to the existing IEEE 802.11 beacon system used for access point presence identification and other purposes.

In one or more embodiments of the invention, the channel update message includes the ratio of a new download bandwidth to a new upload bandwidth. More specifically, the channel update message includes a new ratio of the total available communication bandwidth to be assigned to the bidirectional upload channel and to the bidirectional download channel, e.g., the ration may be 60:40, which represents that 60% of the total available communication bandwidth is to be allocated to the bidirectional download channel and 40% of the total available communication bandwidth is to be allocated to the bidirectional download channel.

In one or more embodiments of the invention, the access point sets the download bandwidth of the access point to the ratio of the total communication bandwidth and the upload bandwidth of the access point to a remaining ratio of the total communication bandwidth after sending the channel update message. In one or more embodiments of the invention, the remaining ratio is calculated by the access point based on the determined ratio. In one or more embodiments of the invention, the access point set the download bandwidth of the access point to the new download bandwidth and the upload bandwidth of the access point to the new upload bandwidth after sending the channel update message.

AT STEP 3020, the client sets the download bandwidth and the upload bandwidth based on the received channel update message. In one or more embodiments of the invention, the client set the download bandwidth to the new download bandwidth and the upload bandwidth to the new upload bandwidth based on the information received in the channel update message. At this point the clients and the AP begin communicating using the new upload channel and download channel.

Figure 6:
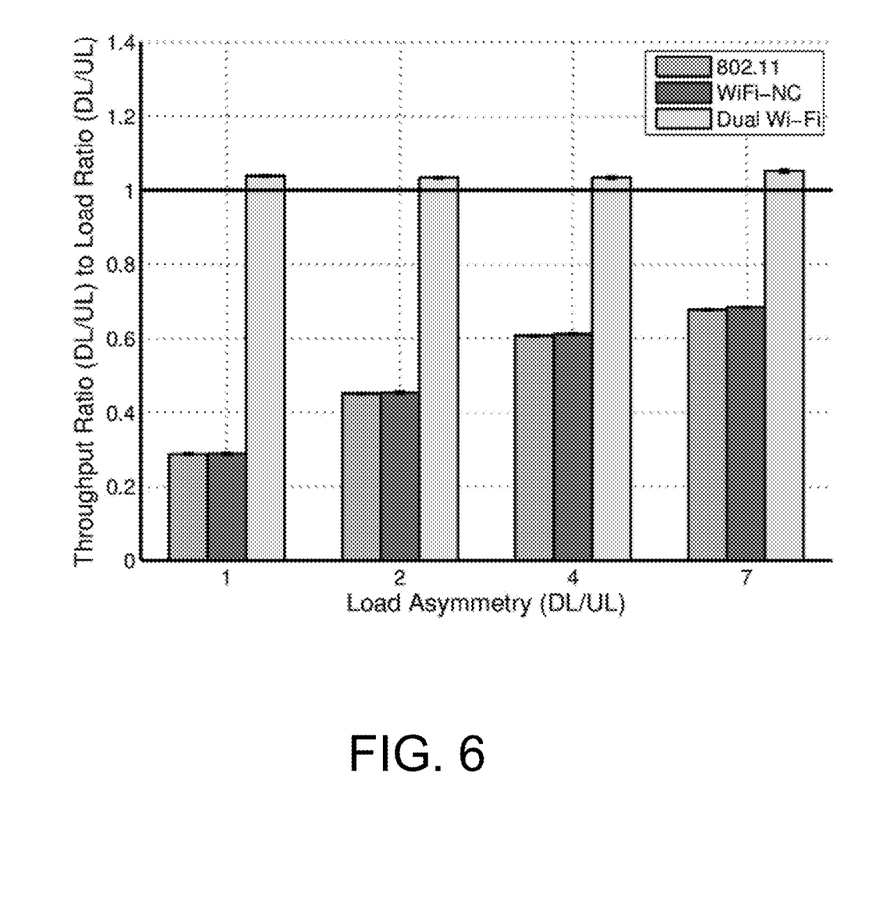
FIG. 6 shows a measured throughput ratio to load ratio of a wireless network in accordance with one or more embodiments of the invention.

FIG. 6 shows a comparison of the throughput ratio to the load ratio of the disclosed wireless communication method to existing communication methods due to load asymmetry. The throughput ratio to the load ratio is the ratio of the performance ratio of the download to upload ratio divided by the ratio of the download traffic load to the upload traffic load. If the ratio of the throughput ratio to the load ratio is not 1, it indicates that the ratio of available download bandwidth to download traffic load or upload bandwidth to upload traffic load is mismatched and results in reduced system performance.

The throughput ratio to the load ratio has been measured for three different communication schemes under various levels of download to upload traffic load asymmetry. As seen from the plots, the Dual Wi-Fi method (which corresponds to an implementation of one or more embodiments of the invention) is able to match the download bandwidth to the download traffic load and upload bandwidth to upload traffic load independent of load asymmetry. Existing communication methods, such as IEEE 802.11 and WiFi-NC, are unable to provide matched download bandwidth to the download traffic load and upload bandwidth to upload traffic load independent of load asymmetry. By matching these ratios, the disclosed method of wireless network communication provides improved wireless link efficiency.

Figure 7:
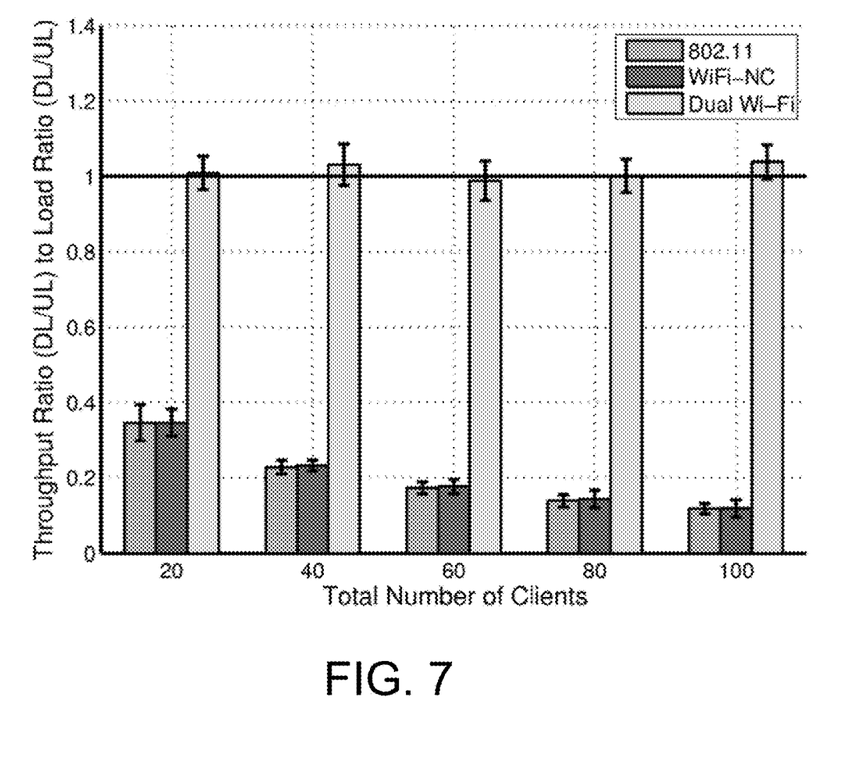
FIG. 7 shows a measured throughput ratio to load ratio of a wireless network in accordance with one or more embodiments of the invention.

FIG. 7 shows a comparison of the throughput ratio to the load ratio of the disclosed wireless communication method to existing communication methods due to client increase. As the number of clients communicating with any access point increases, channel contention increases.

The throughput ratio to the load ratio has been measured for three difference communication schemes under various levels of client load. As seen from the plots, the Dual Wi-Fi method (which corresponds to an implementation of one or more embodiments of the invention) is able to match the download bandwidth to the download traffic load and upload bandwidth to upload traffic load independent of the client load. Existing communication methods, such as IEEE 802.11 and WiFi-NC, are unable to provide matched download bandwidth to the download traffic load and upload bandwidth to upload traffic load independent of client load. By matching these ratios independently of client load, the disclosed method of wireless communication provides improved wireless link efficiency.

Figure 8:
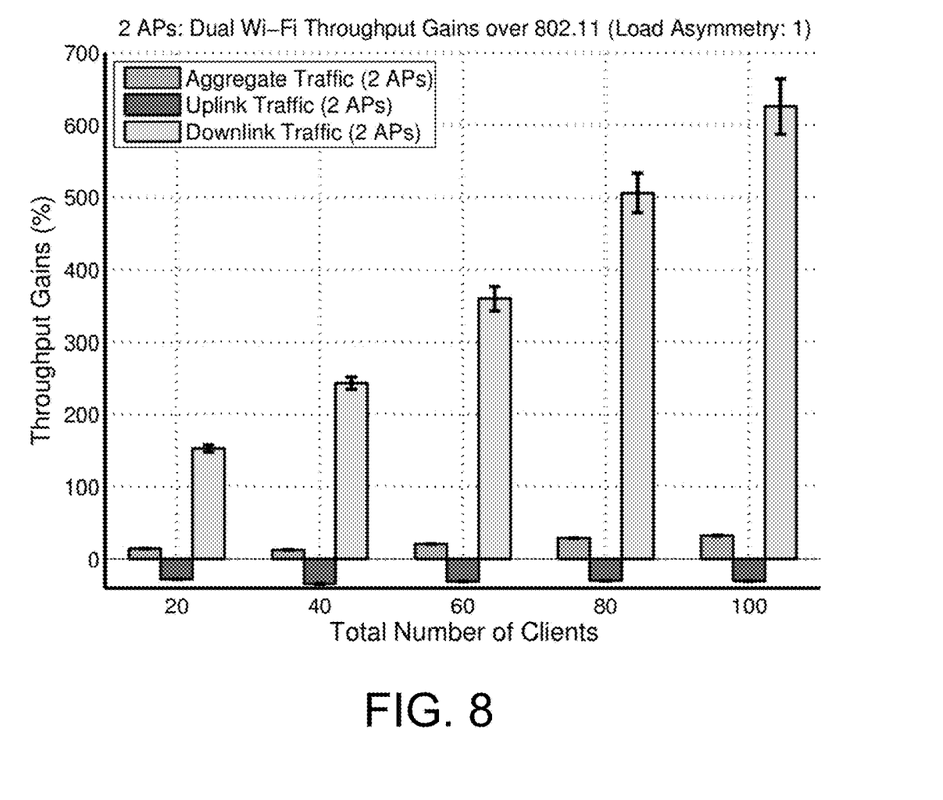
FIG. 8 shows a gain of a wireless network over an existing wireless network in accordance with one or more embodiments of the invention.

FIG. 8 shows a comparison of the throughput gain of an implementation of one embodiment of the invention versus IEEE 802.11 for increasing levels of client load on an access point. The throughput gains are broken down into aggregate traffic, upload traffic, and download traffic. As seen from the plot, as the total number of clients increases, APs and clients implementing embodiments of the invention significantly improves download traffic and shows significant improvements in aggregate traffic, e.g. aggregate traffic improves by more than 30% for 100 clients. Accordingly, embodiments of the invention may significantly improve download traffic which greatly improves the user experience of the client.

Embodiments of the invention enable the division of the total assigned bandwidth into two physical, bidirectional channels. The bidirectional upload channel and bidirectional download channel operate independently and asynchronously and are physically implemented in either contiguous or non-contiguous frequency. The spectrum resources allocated to each channel is configurable by the access point (110).

Embodiments of the invention enable decoupling of the upload and download medium access by assigning the bidirectional upload channel and bidirectional download channel by message origination. Through this allocation, messages sent via the bidirectional download channel and bidirectional upload channel never compete for the same spectrum resources, thereby allowing for simultaneous, asynchronous, and independent upload and download Media Access Control (MAC) layer data-handshakes. Consequently, in one or more embodiments of the invention the channel architecture achieves spectrum isolation between messages sent via the bidirectional upload channel and the bidirectional download channel.

Embodiments of the invention enable physical bidirectional communication within the bidirectional upload channel and the bidirectional download channel to support the complete MAC-layer data-acknowledgement handshake. Specifically, MAC data traffic in each channel includes the data flowing in one direction as originated messages and Acknowledgments (ACKs) as acknowledgement messages associated with the originated messages. Thus, no generic control messages use either the bidirectional upload channel or the bidirectional download channel, only the acknowledgement messages for the originated messages traveling in each channel. Thus, the bidirectional upload channel and bidirectional download channel provide control feedback (acknowledgement messages) that are paired with transmitted data (originated messages), allowing asynchronous and independent upload and download MAC traffic operation in each channel.

One potential benefit of the bidirectional upload channel and bidirectional download channel is the capability to perform independent and asynchronous upload and download MAC level data-ACK transmissions. Having the complete MAC data-ACK handshake in each channel allows the system to adjust MAC and Physical Layer level mechanisms to independently address upload and download resource allocation. In one or more embodiments of the invention, the bidirectional capability of each channel permits independent performance between upload and download MAC level traffic.

Embodiments of the invention may impact the number of contending nodes, e.g. APs (110) and clients (120A, 120B), for each channel. In one embodiment of the invention, the number of contending nodes is reduced to only the number of APs (110) in the bidirectional download channel. For example, in the case when a single AP (110) is contending for the bidirectional download channel, the contention for the channel is eliminated which allows the bidirectional download data channel to send back-to-back data transmission achieving close to full channel utilization. In another example, only the clients (120A, 120B) contend for the bidirectional upload channel. Consequently, smaller number of nodes competing for the bidirectional upload channel or bidirectional download channel reduces coordination time, the number of collisions and retransmissions, and thus increases spectral efficiency.

In many WLANs scenarios, the load transmitted from the AP (110) to the clients (120A, 120B) far outweighs traffic demand from the clients (120) to the AP (110), thereby yielding traffic asymmetry. One or more embodiments of the invention allows the flexible allocation of spectrum resources to the logical channels. Based on the premise that download data traffic is typically greater than upload data traffic load, embodiments of the invention may allocate the bidirectional download channel with more bandwidth, e.g. increasing the download bandwidth (441) and decreasing the upload bandwidth (442). Thus, the bidirectional download channel may independently transmit more data than the bidirectional upload channel at any instant.

When many clients (120) associate with a single AP (110), for example, a large number of mobile phones with a single AP (110), the clients (120) cause a disproportional amount of medium contention compared to the AP (110), which produces contention asymmetry. One or more embodiments of the invention address contention asymmetry by eliminating the uneven number of upload and download devices competing for the bidirectional upload channel or bidirectional download channel. More specifically, because clients (120A, 120B) only contend for the bidirectional upload channel and APs (110) only contend for the bidirectional download channel, medium access contention in each channel is directly weighted on the traffic load of that direction.

Embodiments of the invention provide the flexibility to separately address upload and download resource allocation. Thus, in the presence of an upload or download medium access issue, systems that implement embodiments of the invention allows for an in-channel solution that is only applied where required. For example, in the presence of upload hidden terminals, the channel architecture allows the implementation of any existing in-channel hidden terminal MAC, such as RTS-CTS that is applied only to the upload channel. In one or more embodiments of the invention, the system isolates upload and download factors, allowing the system to separately address issues found in either upload or download transmissions.

Embodiments of the invention may increase network performance without increasing the network resources. Instead of increasing spectrum resources, embodiments of the invention provide a mechanism to allocate traffic within the channel to achieve higher spectral efficiency.

Further embodiments of the invention enable the pre-allocation of spectrum resources and achieve isolation between upload and download traffic. Because existing multi-channel systems do not differentiate between upload and download traffic, increases in data rates are limited by upload vs. download contention within the narrow channels. Embodiments of the invention pre-allocate the upload bandwidth (442) and download bandwidth (441) to the bidirectional download channel and bidirectional upload channel which presents the capability to adapt spectrum resources to the traffic load, instead of presenting limited fixed width sub-channels.

Embodiments of the invention permit physical bidirectional communication within the bidirectional upload channel and bidirectional download channel, and thereby enable the complete MAC-layer data-ACK handshake within each channel. As a result, embodiments of the invention may enable in-channel control feedback that is paired with transmitted data (originated messages) that allows asynchronous and independent upload and download MAC traffic operation. Further, embodiments of the invention enable the configuration of bandwidth resources of each sub-channel to match the system's traffic asymmetry or a desired download and upload service.

Embodiments of the invention may combat traffic asymmetry from within the channel, without requiring adjusting the total communication bandwidth (140). Specifically, embodiments of the invention combat the issue from the origin by separating upload and download contention to provide the bandwidth each requires.

Additional embodiments of the invention isolate upload and download data traffic, as a result traffic asymmetry may be addressed under any environment. Moreover, embodiments of the invention provide a mechanism to select the amount of bandwidth provided to either traffic direction that are guaranteed. In contrast to a shared band system where this is not easily defined and guaranteed.

Embodiments of the invention may support instantaneous adaptation of bandwidth allocation by permitting dynamic channel bandwidth division by adjusting the download bandwidth (441) and the upload bandwidth (442).

While the invention has been described with respect to a limited number of embodiments, those skilled in the art, having the benefit of this disclosure, will appreciate that other embodiments can be devised which do not depart from the scope as disclosed herein. Accordingly, the scope should be limited by the attached claims.

What is claimed is:

1. A method of operating a wireless local area network between a client and an access point (AP) to increase efficiency of a total communication bandwidth, the method comprising:
    determining, by the AP, a ratio of a download load to an upload load between the AP and the client;
    allocating, by the AP and based on the ratio, a first portion of the total communication bandwidth to a wireless bidirectional upload channel,
    allocating, by the AP and based on the ratio, a second portion of the total communication bandwidth to a wireless bidirectional download channel,
    wherein the wireless bidirectional download channel and the wireless bidirectional upload channel are spectrally isolated and operated asynchronously;
    sending, by the AP, a channel update message comprising the ratio to the client,
    wherein the client is restricted from sending client-originated messages over the wireless bidirectional download channel to reduce contention for the wireless bidirectional download channel;
    receiving, by the AP comprising an antenna, a client-originated message over the wireless bidirectional upload channel;
    sending, by the AP, an AP-acknowledgement message to the client over the wireless bidirectional upload channel;

sending, by the AP, an AP-originated message to the client over the wireless bidirectional download channel, wherein the AP-originated message was generated in response to the client-originated message; and receiving, by the AP, a client-acknowledgment message from the client over the wireless bidirectional download channel.

2. An access point (AP) that increases the efficiency of a total communication bandwidth in a wireless local area network, comprising:
- a download chain comprising a download media access control layer and a download physical layer, a download transceiver, and a download antenna, wherein the download chain is configured to:
  - send an AP-originated message over a wireless bidirectional download channel,
  - receive a client-acknowledgement message on the wireless bidirectional download channel,
- an upload chain comprising an upload media access control layer and an upload physical layer, an upload transceiver, and an upload antenna, wherein the upload chain is configured to:
  - receive a client-originated message over a wireless bidirectional upload channel,
  - send a AP-acknowledgement message on the wireless bidirectional upload channel,
- an AP controller configured to:
  - forward the download data to the download chain,
  - forward the upload acknowledgement to the upload chain,
  - determine a ratio of a download load to an upload load between the AP and the client;
  - allocate, based on the ratio, a first portion of the total communication bandwidth to the wireless bidirectional upload channel;
  - allocate, based on the ratio, a second portion of the total communication bandwidth to the wireless bidirectional download channel,
- wherein the wireless bidirectional download channel and the wireless bidirectional upload channel are spectrally-isolated and operated as asynchronously;
- generate a channel update message comprising the ratio for transmission to the client,
- wherein the client is restricted from sending client-originated messages over the wireless bidirectional download channel to reduce contention for the wireless bidirectional download channel.

* * * * *